UNITED STATES PATENT OFFICE.

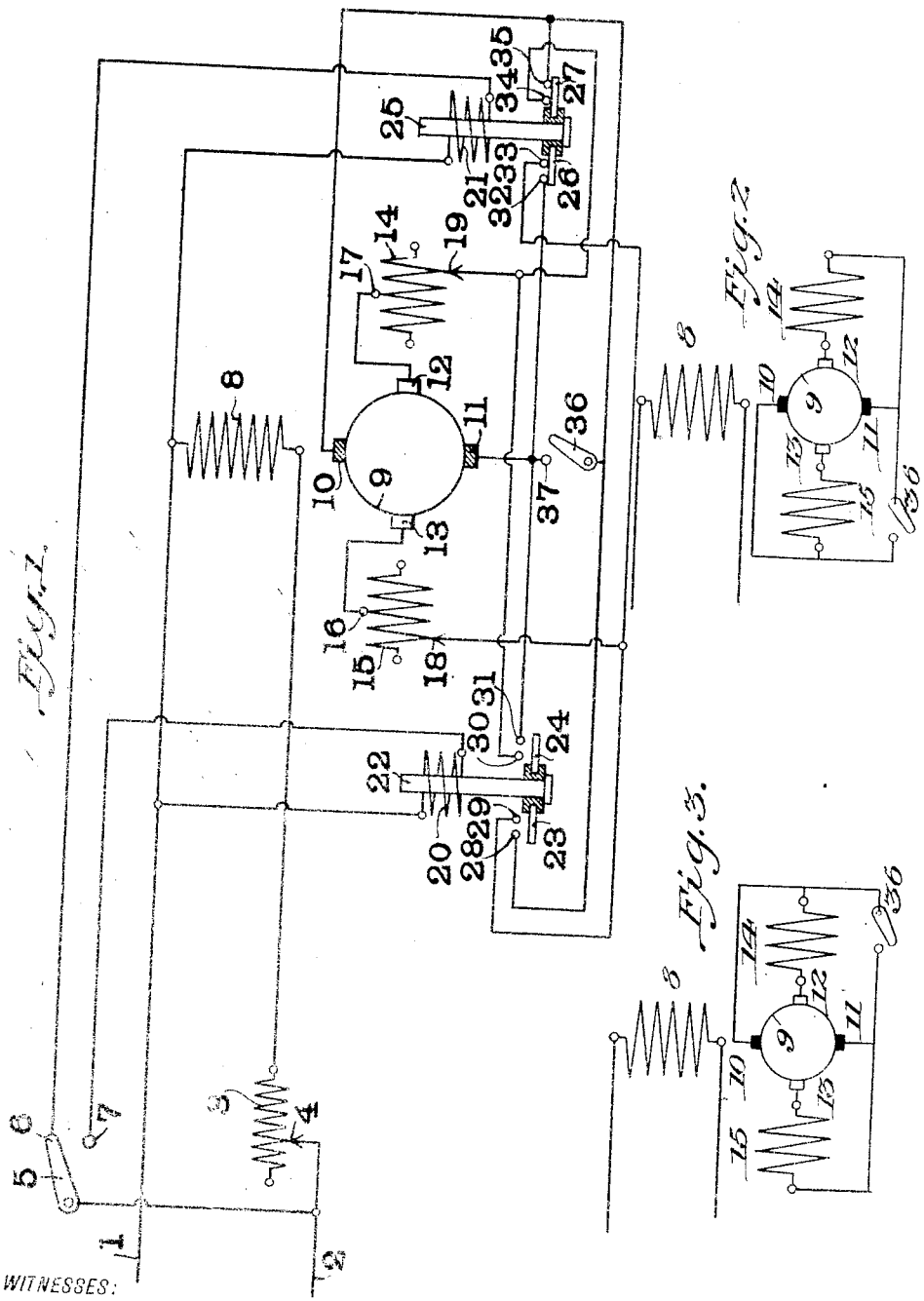

VALÈRE ALFRED FYNN, OF LONDON, ENGLAND.

ALTERNATING-CURRENT MOTOR.

1,085,807.
Specification of Letters Patent.
Patented Feb. 3, 1914.

Application filed May 23, 1911. Serial No. 628,897.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to single phase alternating current commutator motors of the induction type and more particularly to motors having working and exciting brushes which start as self-excited series induction motors and operate as such, or are converted into motors with a shunt characteristic after a certain speed has been reached.

It has been proposed, in order to vary the starting torque or the speed torque curve of the type of series motors above referred to, to suitably displace all the brushes, or the exciting brushes only, or to interpose an adjustable ratio series transformer between the working and the exciting brushes. It is mechanically objectionable, and sometimes impossible, to move the brushes and it is expensive to provide an adjustable series transformer.

It is the object of my invention to produce a single phase self-excited series induction motor the starting torque, the speed torque curve and the power factor of which can be easily adjusted to suit any given conditions and which can be easily converted into a machine with a shunt characteristic when desired without moving any brushes or using any transformers external to the motor.

My invention will be better understood by reference to the following description taken in connection with the accompanying diagrammatic drawings, in which—

Figure 1 shows a two-pole form of my improved motor arranged to be partly controlled from a distance, and Figs. 2 and 3 show the circuits established by the switches 22 and 25 respectively.

The stator carries a main inducing winding 8 connected to the mains 1, 2, by way of the regulating resistance 3. The position of the movable contact 4 on 3 determines the volts per turn impressed on 8.

The rotor is provided with a commuted winding 9 on which rest the working brushes 10, 11 and the exciting brushes 12, 13. The former are preferably placed co-axially with 8, the latter are preferably displaced by 90 electrical degrees from the former as shown.

The two stator field windings 14, 15 are displaced by 90 electrical degrees from the main inducing winding. Each stator field winding is included between one set of working and one set of exciting brushes. The magnitude and direction of the magnetization produced by each stator field winding is adjustable at 18 and 19 respectively. The direction of rotation depends on whether the working brush 10 is connected to the exciting brush 12 and the working brush 11 to the exciting brush 13 or whether 10 is connected to 13 and 11 to 12. In the example shown these connections are controlled by the two way switch 5, which may be placed at any desired distance from the motor. Switch 5 controls the solenoids 20 and 21 and the latter control the switch blades 23, 24 and 26, 27, by means of which the interconnections between working and exciting brushes are made. In the figure switch 5 stands on point 6,—the solenoid 21 is therefore energized and it attracts the core 25 and causes the blade 26 to connect points 32 and 33, also the blade 27 to connect points 34 and 35. The rotor connections are therefore as follows: from the working brush 10 to contact 35, blade 27, contact 34, movable contact 19, through part of the stator field winding 14 to point 17 midway on 14, to the exciting brush 12, the commuted winding 9, the exciting brush 13, the point 16 midway on the stator field winding 15, through part of that winding to the movable contact 18, to point 33, blade 26, point 32, working brush 11, to the commuted winding 9 and back to brush 10. In other words, the working brush 10 is connected to the exciting brush 12 by way of the stator field winding 14 and the working brush 11 is connected to the exciting brush 13 by way of the stator field winding 15. In order to reverse the direction of rotation of the motor, switch 5 is moved from point 6 to point 7. The switch blades 26 and 27 then disengage from the contacts 32, 33 and 34, 35 respectively while the contacts 28, 29 and 30, 31 are bridged by the blades 23 and 24 respectively because the solenoid 20 is now energized and attracts its core 22. Whenever the motor is in operation and it is desired to convert same into a machine with a shunt characteristic I short-circuit the working brushes 10, 11 by means of the switch 36.

The resistance 3 is preferably used at starting only, but can be used for adjusting the speed torque curve of the machine, as long as the latter operates with a series characteristic, or for adjusting the maximum output of the machine as long as the latter operates with a shunt characteristic. The speed torque curve of the motor operating with a series characteristic and its power factor at a given speed can, however, be much more economically adjusted by suitably adjusting the magnitude and the direction of the magnetization produced by one or more of the stator field windings. This is achieved in the figure by suitably displacing contacts 18 or 19 or both. When the magnetization due to the stator field windings opposes that due to the rotor along the same axis, then the motor will be able, when running with a series characteristic, to develop a greater torque at a given speed and vice versa. A high power factor will also be reached under these conditions at a lower speed.

After the motor has been converted into a machine with a shunt characteristic by closing switch 36, its speed can be adjusted by varying the magnitude or direction of the magnetization produced by one or more of the stator field windings. The number of turns and the direction of magnetization produced by the stator field windings can be adjusted once for all and any necessary additional regulation can be carried out in some other way, for instance, by means of the resistance 3.

Although a two-pole motor has been described it will be understood that the invention is applicable to machines with any number of pole pairs.

Having fully described my invention, what I claim as new and desire to secure by Letters Patent of the United States, is:

1. In an alternating current motor, the combination with an inducing member provided with a main inducing winding, of an induced member provided with a commuted winding, a working brush located in the axis of the main inducing winding, two exciting brushes each displaced therefrom, and an auxiliary winding on the induced member displaced from the main winding, the working brush being connected to one or the other only of the exciting brushes and said connection including the auxiliary winding.

2. In an alternating current motor, the combination with an inducing member provided with a main inducing winding, of an induced member provided with a commuted winding, two working brushes each in the axis of the main inducing winding, an exciting brush displaced therefrom, and an auxiliary winding on the induced member displaced from the main winding, the exciting brush being connected to one or the other only of the working brushes and said connection including the auxiliary winding.

3. In an alternating current motor, the combination with an inducing member provided with a main inducing winding and two auxiliary windings displaced therefrom, of an induced member provided with a commuted winding, working brushes coaxial with the main inducing winding, exciting brushes displaced from the working brushes, and means for establishing two circuits each including one auxiliary winding, one of the working brushes and one of the exciting brushes.

4. In an alternating current motor, the combination with an inducing member provided with a main inducing winding and two auxiliary windings displaced therefrom by 90 electrical degrees, of an induced member provided with a commuted winding, working brushes coaxial with the main inducing winding, exciting brushes displaced by 90 electrical degrees from the working brushes, and means for establishing two circuits each including one auxiliary winding, one of the working brushes and one of the exciting brushes.

5. In an alternating current motor, the combination with an inducing member provided with a main inducing winding and two auxiliary windings displaced therefrom, of an induced member provided with a commuted winding, working brushes coaxial with the main inducing winding, exciting brushes displaced by 90 electrical degrees from the working brushes, and means for establishing two circuits each including one auxiliary winding, one of the working brushes and one of the exciting brushes.

In testimony whereof, I have hereunto set my hand and affixed my seal in the presence of the two subscribing witnesses.

VALÈRE ALFRED FYNN. [L. S.]

Witnesses:
W. A. ALEXANDER,
ELIZABETH BAILEY.